No. 894,721. PATENTED JULY 28, 1908.
J. H. BYRON.
FEED BAG SUPPORT.
APPLICATION FILED AUG. 29, 1907.
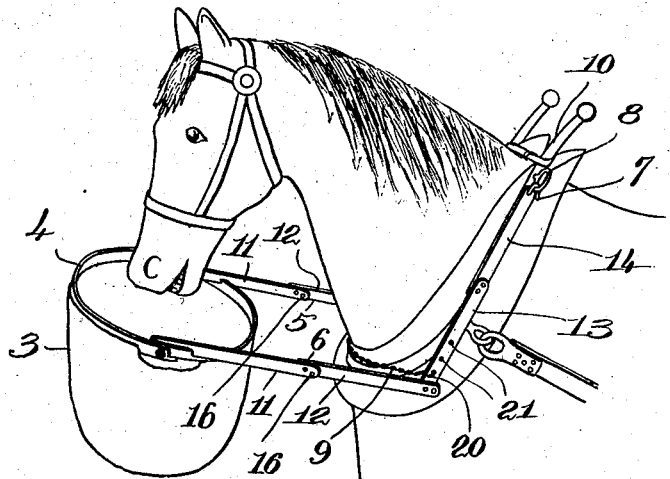
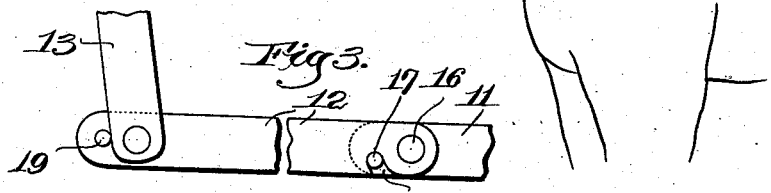
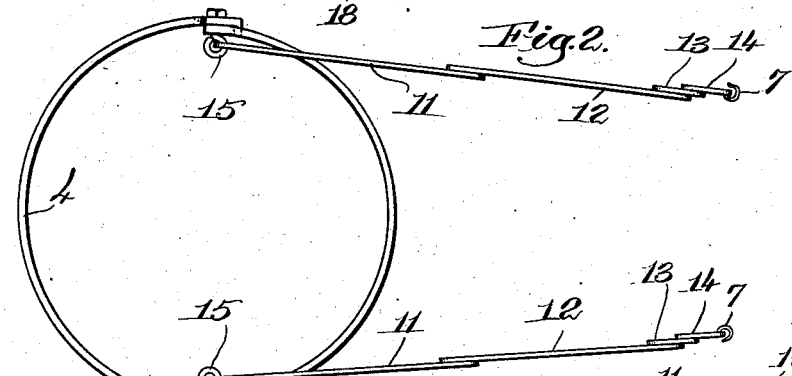
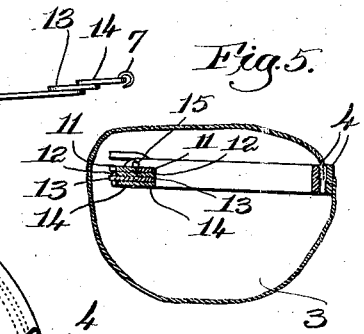
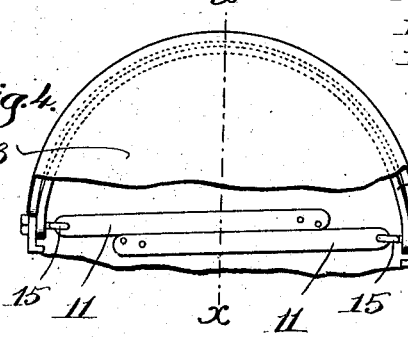
Witnesses
Thomas J. Drummond
Joseph M. Ward
Inventor.
James H. Byron,
by Beverly Byron
attys.

UNITED STATES PATENT OFFICE.

JAMES H. BYRON, OF BOSTON, MASSACHUSETTS, ASSIGNOR OF ONE-HALF TO CHARLES D. RICHARDSON, OF BOSTON, MASSACHUSETTS.

FEED-BAG SUPPORT.

No. 894,721.　　　Specification of Letters Patent.　　　Patented July 28, 1908.

Application filed August 29, 1907. Serial No. 390,616.

*To all whom it may concern:*

Be it known that I, JAMES H. BYRON, a citizen of the United States, and a resident of Boston, in the county of Suffolk and State of Massachusetts, have invented an Improvement in Feed-Bag Supports, of which the following description, in connection with the accompanying drawing, is a specification, like letters on the drawing representing like parts.

This invention has for its object to provide a novel support for a feed bag by which said bag can be attached to and supported from the harness of the horse instead of from the horse's head.

My novel feed bag support is so arranged that it can be secured to the hames of a harness so that the weight of the feed bag will come entirely on the collar of the horse. The support is also preferably made foldable, and the frame of the bag may also be foldable so that when not in use the support and feed bag may be folded up into a compact space.

I will first describe one embodiment of my invention and then point out the novel features thereof in the appended claims.

In the drawings, Figure 1 shows in perspective the front portion of a horse with a feed bag embodying my invention applied thereto; Fig. 2 is a top plan view of the feed bag support with the chain 9 omitted; Fig. 3 is an enlarged detail view showing the joint of the support; Fig. 4 is a view showing the feed bag and its support folded, part of the feed bag being broken out to show the construction; Fig. 5 is a section on the line x—x, Fig. 4.

3 is the feed bag which may be made of canvas or any other suitable flexible material. It is supported from a frame 4 to which it is secured in any suitable or usual way. The frame has attached thereto two supporting members 5 and 6 which when in their operative position are substantially L-shaped and are provided at their upper ends with hooks 7 adapted to hook into the rings 8 on the hames 10 through which the reins pass and by which they are guided. Owing to the L-shape of the supporting members 5 and 6, one arm of each member extends downwardly substantially parallel with the hames 10, and the other arms of the members extend forwardly and thus support the feed bag in convenient position for the horse to feed therefrom. To prevent the supporting members from swinging backwardly owing to the weight of the feed bag, I connect them by means of a chain or other flexible connection 9 which is arranged to rest against the lower portion of the collar of the horse, and which serves to keep the bag in proper position.

With the construction above described the weight of the feed bag is taken entirely by the collar of the horse and yet the bag is firmly held in convenient position for the horse to feed therefrom.

In order to make the feed bag a convenient one for carrying about, I propose to make the supporting members 5 and 6 so that they can be folded into a compact space and also to make the frame 4 capable of folding. For this purpose each supporting member is made in sections which are hinged together, and in the present embodiment of my invention each supporting member comprises the four sections 11, 12, 13 and 14. The sections 11 are pivotally connected to the frame 4 at 15 and the sections 12 are pivoted to the sections 11 at 16. The pivotal connections 16 are in the form of a knuckle joint which permits the two members 11 and 12 to fold in one direction but prevents them from folding in the other direction. This is accomplished as herein shown by providing each section 11 with a stop pin 17 adapted to enter a recess 18 formed in the under side of the member 12 when the two parts are in their extended position, as shown in Figs. 1 and 3. Each section 13 is pivoted to the end of the section 12 and a suitable stop 19 is provided which limits the backward swinging movement of the section 13. The sections 13 and 14 are pivoted together in the same manner as the sections 11 and 12. Where this construction is employed, the sections 14 may be folded over forwardly on to the sections 13 and then the two folded sections 13 and 14 may be folded forwardly on to the sections 12 and the three sections of each arm folded again on to the sections 11, as will be obvious, so that each of the supporting members when folded will occupy a space no longer than the section 11. When the sections are unfolded, however, as shown in Fig. 1, the joints are rigid so that the two supporting members will be held in the position shown in Fig. 1.

The sections of the supporting members are preferably of a length less than the diameter of the frame 4 and the pivotal connection 15 between the sections 11 and the frame is such that when the supporting members are folded they can be swung inwardly across the frame, as shown in Fig. 4, so as to be received entirely within the frame. The frame 4 is made with the two halves which are pivoted together at the point of pivotal connection 15, and where this construction is employed, the frame may be folded, as shown in Figs. 4 and 5, after the supporting members have been folded and placed within the bag so that when the bag is folded the supporting members are confined entirely within the bag, and the folded structure therefore occupies a minimum space. Any suitable pivotal connections between the sections 11 and the frame may be employed, but I prefer to hinge said members to an eye, as shown in Fig. 2, because this permits the members 12 to be swung inwardly within the frame.

The flexible connection 9 is preferably provided with a hook 20 at each end which hook may be hooked into any one of a number of apertures 21 in the sections 13. This permits the flexible connection 9 to be placed at different elevations as required for horses of different sizes.

I have not illustrated herein all embodiments of my invention but have selected the present embodiment merely as illustrating the principle of the invention.

Having fully described my invention, what I claim as new and desire to secure by Letters Patent is:—

1. The combination with a feed bag, of L-shaped supporting members therefor adapted to be secured to the hames of a harness, and a flexible connection adjustably connecting said members near the angle thereof.

2. The combination with a feed bag frame and a feed bag sustained thereby, of L-shaped supporting members pivoted to the frame, each arm of each member being jointed.

3. The combination with a feed bag frame and a feed bag sustained thereby, of foldable L-shaped supporting members pivoted to the frame, each arm of each supporting member being formed of sections jointed together with a knuckle joint.

4. The combination with a feed bag frame made in two sections jointed together, of a bag supported from said frame, and two L-shaped foldable supporting members pivotally secured to the feed bag frame, said supporting members when folded being of a size to be received within the folded feed bag frame.

5. The combination with a feed bag frame made in two sections jointed together, of a feed bag supported from said frame and two L-shaped foldable supporting members pivotally secured to the inside of the feed bag frame at the joints thereof, each arm of each supporting member being made of sections jointed together, which sections are of a length less than the diameter of the frame.

In testimony whereof, I have signed my name to this specification, in the presence of two subscribing witnesses.

JAMES H. BYRON.

Witnesses:
   MARGARET A. DUNN,
   LOUIS C. SMITH.